United States Patent Office 3,718,567
Patented Feb. 27, 1973

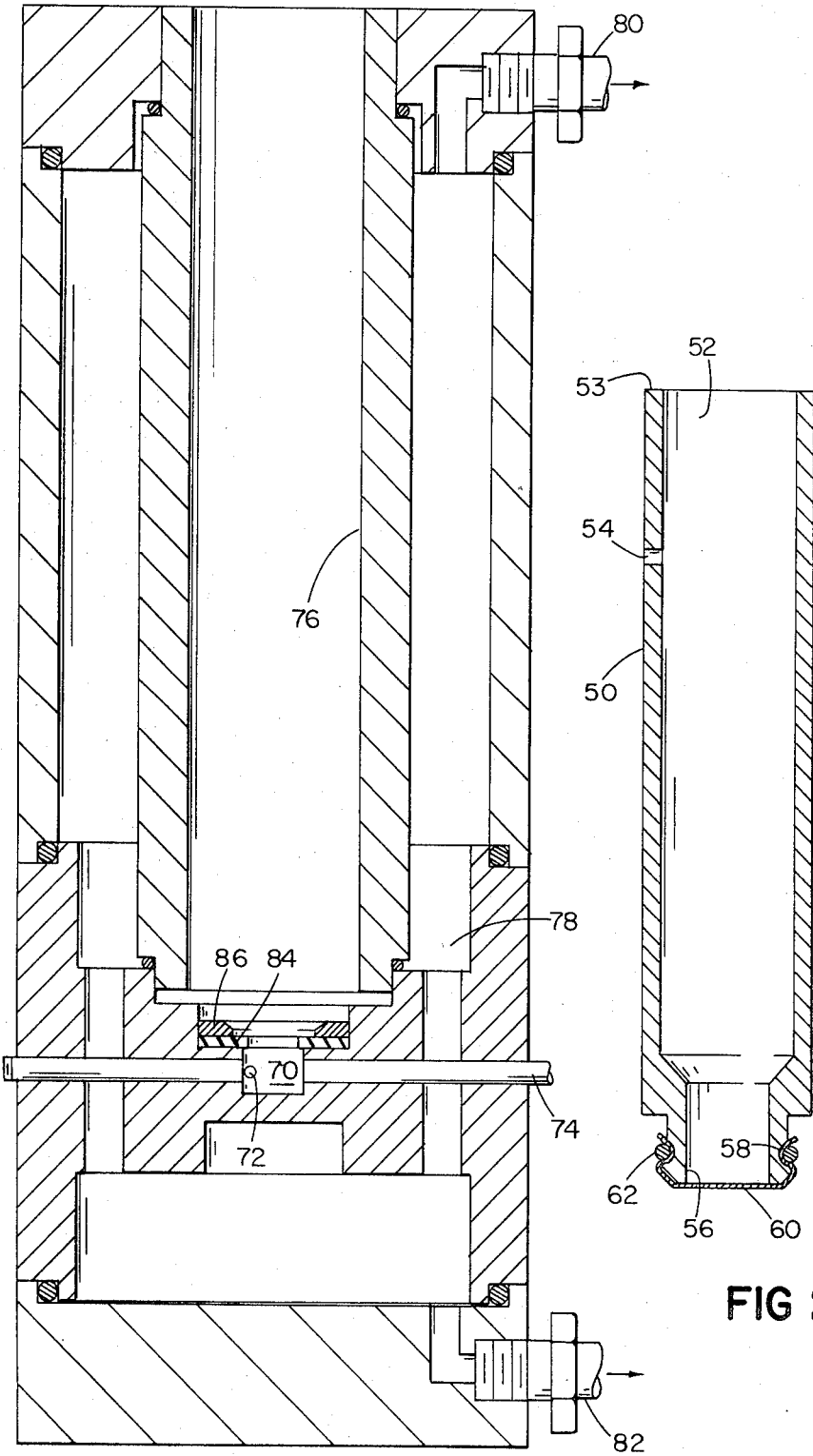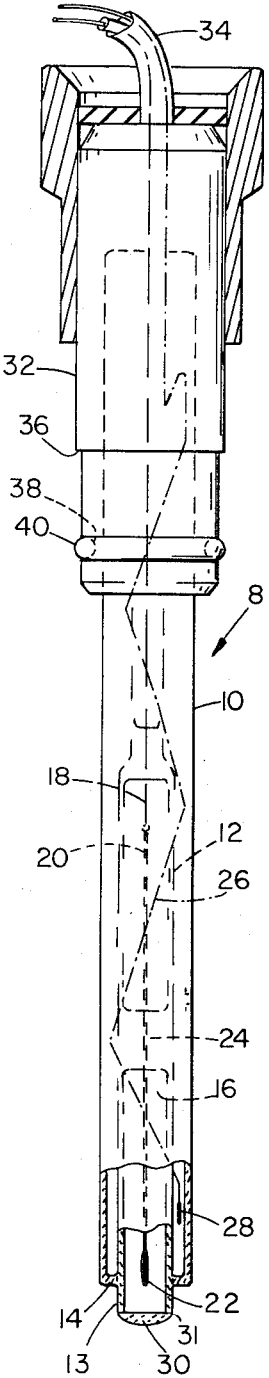
Feb. 27, 1973    I. A. HADDAD ET AL    3,718,567
ELECTRODE ASSEMBLY
Filed April 7, 1970    2 Sheets-Sheet 1
FIG 1
FIG 2
FIG 3

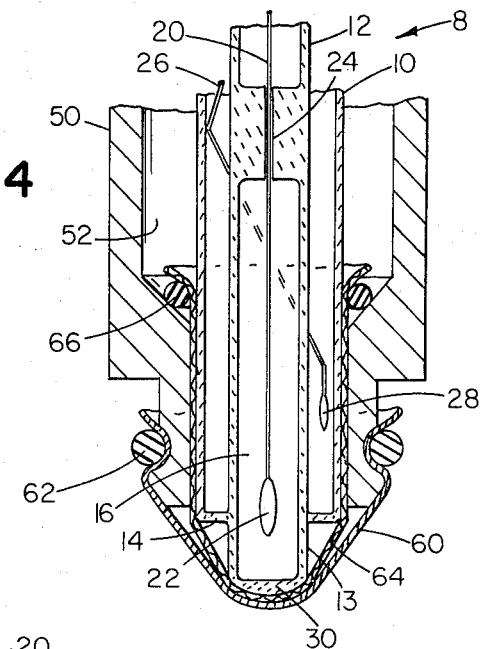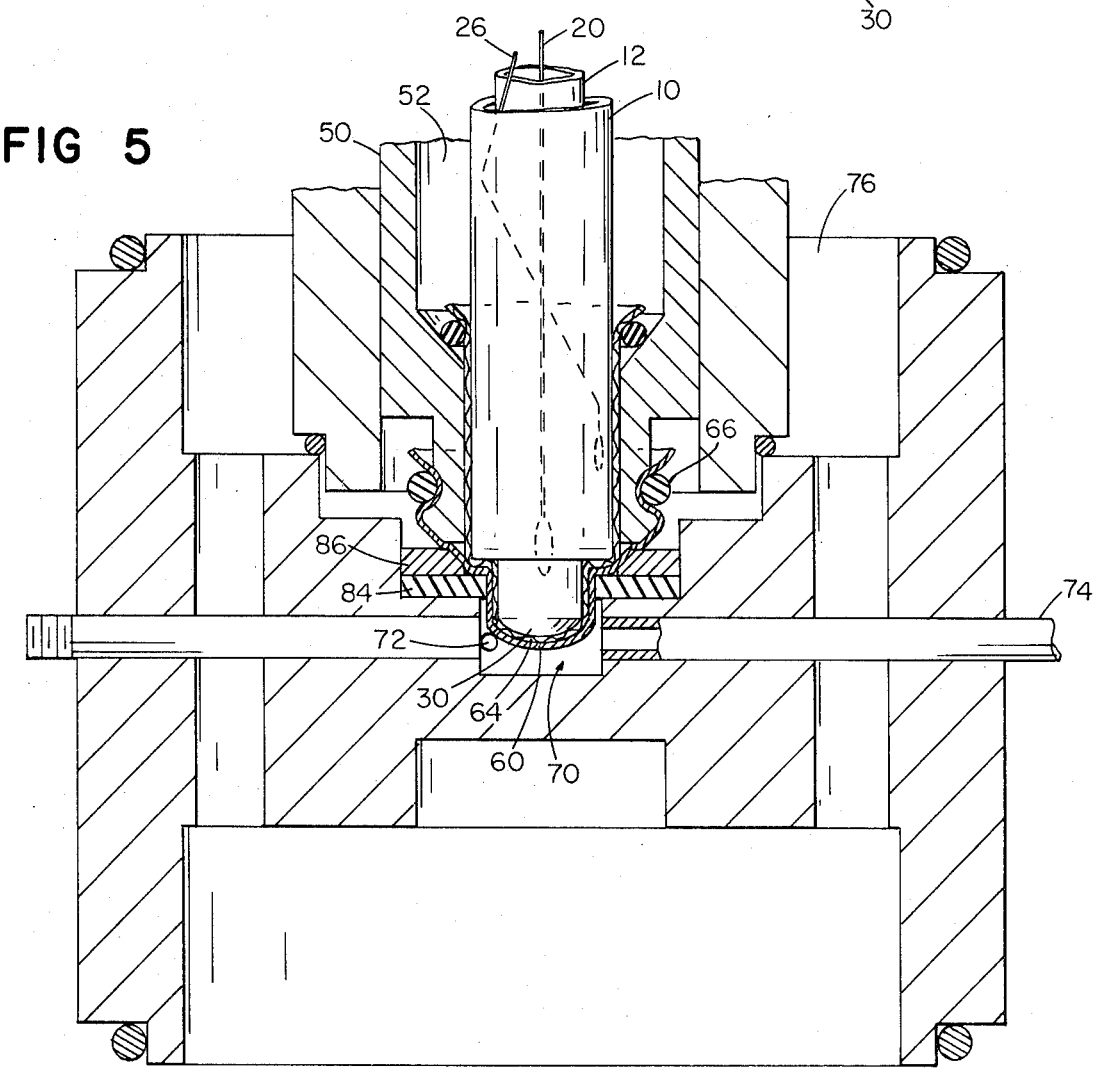

3,718,567
ELECTRODE ASSEMBLY
Ihsan A. Haddad, Brighton, and Thomas A. Rosse, Lexington, Mass., assignors to Instrumentation Laboratory, Inc., Lexington, Mass.
Filed Apr. 7, 1970, Ser. No. 27,194
Int. Cl. G01n 27/46
U.S. Cl. 204—195 P
7 Claims

ABSTRACT OF THE DISCLOSURE

Electrochemical apparatus includes an electrode assembly having an electrolyte chamber with a projecting stem portion. A pH sensitive membrane is secured across the end of the projecting stem portion and a selectively permeable membrane is secured over the pH sensitive membrane. The electrode assembly is disposed in an analysis chamber so that the pH sensitive membrane is entirely within the analysis chamber. A clamp at the port of the analysis chamber clamps the selectively permeable membrane against the external surface of the stem.

SUMMARY OF INVENTION

This invention relates to electrode assemblies from use in analysis of fluids, and more particularly to electrode assemblies of the type that employ a selectively permeable membrane interposed between an electrode and the sample to be analyzed.

The direct measurement of $P_{CO_2}$ may be made potentiometrically through the use of an electrode assembly that includes a pH sensitive glass membrane positioned behind a $CO_2$ permeable membrane. When the electrode assembly is exposed to a fluid containing carbon dioxide, the carbon dioxide diffuses across the membrane in response to a partial pressure difference and equilibrates electrolyte confined between the permeable membrane and the glass membrane with the external gas tension causing a change in hydrogen ion activity. The electrode assembly senses changes in $CO_2$ as a change in pH of the electrolyte and develops a voltage exponentially related to $p_{CO_2}$.

The characteristics of the electrode assembly are a function of relationships of electrode components to the permeable membrane and to the electrolyte interposed between the electrode components and the permeable membrane. Changes in these relationships, due for example to external forces such as occur in an automatic sample induction system, result in non-reproducibility of readings and render calibration of the electrode assembly difficult. A particular problem arises in connection with the measurement or analysis of very small samples of precious fluids such as human blood. The measurement should be reproducible, easily calibrated, and the apparatus must be easy to clean so that all sources of cross contamination are avoided.

It is an object of this invention to provide a novel and improved electrode assembly of a type suitable for measuring $p_{CO_2}$ which exhibits rapid response time and a high degree of sensitivity.

Another object of the invention is to provide novel and improved $P_{CO_2}$ measurement apparatus that is particularly adapted for analysis of precious fluids.

Still another object of the invention is to provide a novel and improved electrode assembly which facilitates cleaning and cailbration.

Still another object of the invention is to provide a novel and improved $p_{CO_2}$ electrode assembly of the type which employs a selectively permeable membrane in which the boundary conditions between the several components are established and stabilized with greater precision.

In accordance with the invention there is provided an electrochemical analysis apparatus which includes an electrode assembly including structure defining a chamber for receiving electrolyte and a half cell in the chamber for contact with the electrolyte, and an electrical conductor providing an electrical conduction path between the half cell and the exterior of the electrode assembly. The chamber has a projecting stem portion of smaller dimensions than the main portion of the chamber defining structure, and a pH sensitive membrane is secured across the end of the projecting stem portion. The external diameter of the stem portion is at least as great as the external diameter of the pH sensitive membrane in the plane of the annular junction zone. A selectively permeable membrane is secured over said pH sensitive membrane and the stem portion. An analysis chamber has a port for receiving the pH sensitive membrane and the stem portion so that the pH sensitive membrane is entirely within the analysis chamber. Constricting means adjacent the chamber port clamps the selectively permeable membrane against the external surface of the stem portion to maintain the selectively permeable membrane in taut relation over the external surface of the pH sensitive membrane so that the permeable membrane conforms to the surface configuration of the entire external surface of the pH sensitive membrane.

In particular embodiments the electrode assembly is a combination electrode having two glass tubes in coaxial relation with the pH sensitive membrane being a smoothly curved glass disc fused to the reduced diameter stem portion of the inner tube. A mesh spacer is secured over the stem and glass membrane and the permeable membrane initially is secured in taut relation over the end of an intermediate electrolyte holder. A washer aligned with the port of the analysis chamber clamps the permeable membrane firmly against the mesh spacer so that a small but accurately defined electrolyte space is defined between the two membranes—this space being entirely within the analysis chamber. The resulting electrode assembly has a small volume of electrolyte retained in an accurately defined chamber and the pH sensitive area is disposed entirely within the analysis chamber so that its entire surface is exposed uniformly to the material diffusing through the permeable membrane. The permeable membrane is secured by the clamping disc so that flushing of the chamber does not disturb the membrane or electrode configuration yet the components may be easily disassembled if necessary.

Electrode assemblies constructed in accordance with the invention provide accurate, reliable and easily calibratable outputs of high sensitivity. The invention provides an assembly readily cleanable by a cuvette flushing solution and allows a minimum of new sample to be introduced to obtain accurate, uncontaminated gas analysis. The electrode assemblies provide reproducible readings with little drift and have rapid response times.

Other objects, features and advantages of the invention will be seen as the following description of a particular embodiment progresses, in conjunction with the drawing, in which:

FIG. 1 is a sectional view of an electrode constructed in accordance with the invention;

FIG. 2 is a sectional view of an electrode housing and membrane support used with the electrode shown in FIG. 1;

FIG. 3 is a sectional view of a cuvette and water bath assembly;

FIG. 4 is a sectional view of portions of the electrode and housing in assembled relation; and FIG. 5 is a sectional view of portions of the electrode, housing and cuvette in assembled relation.

DESCRIPTION OF PARTICULAR EMBODIMENT

The $p_{CO_2}$ electrode assembly 8 shown in FIG. 1 includes an elongated cylindrical glass tube 10, 8.1 millimeters in diameter and about 90 millimeters long. Disposed coaxially within tube 10 is a second glass tube 12, 4.4 millimeters in diameter and about 50 millimeters long. Tube 12 extends about three to four millimeters beyond the end of tube 10 to provide a cylindrical projecting portion 13 and is suitably sealed to tube 10 by glass seal 14 or a silicon rubber O-ring. Disposed axially in tube 12 is a platinum wire 18, 0.2 millimeter in diameter that has a silver wire 20 connected to it on which at its lower end is disposed a silver chloride electrode element 22. A constriction 24 in tube 12 forms a chamber 16 in the lower portion of tube 12 and retains a suitable electrolyte such as potassium chloride surrounding tube 12. Spirally wrapped about tube 12 and disposed within tube 10 with a suitable electrolyte is a silver wire 26, 0.2 millimeter diameter on which at its lower end is disposed a silver chloride electrode element 28.

A membrane 30 of pH sensitive glass 4.4 millimeters in diameter and 1.0–1.5 millimeters in height is secured to the end of tube 12 and forms the lower wall of chamber 16. The outer surface of membrane 30 is a smoothly curved convex surface and the fused annular junction 31 between the membrane 30 and tube 12 provides a smooth continuous surface without concavities.

Leads 18 and 26 extend through coupling 32 for connection via shielded cable 34 to external associated measuring circuitry. Coupling 32 includes a seat surface 36 against which an end surface of a cooperating housing structure is seated and a groove 38 which receives sealing O-ring 40 and cooperates with that housing structure.

With reference to FIG. 2, there is shown a Plexiglass housing 50 which defines a tubular chamber 52 and has an end surface 53 and port 54 in its cylindrical wall. At the base of housing 50 is a bore 56 of reduced diameter into which the lower end of tube 10 is received in sliding relation. The outer wall of the lower end of housing 50 includes a groove 58 and a selectively permeable membrane 60 of suitable material such as silastic rubber 4 mils in thickness is secured with O-ring 62.

The cuvette-water bath assembly shown in FIG. 3 includes a cuvette chamber 70, 0.203 inch in diameter and 0.125 inch high to which is connected a tangentially disposed inlet passage 72 and an outlet passage 74 so that a sample to be analyzed may be disposed in (or flowed slowly through) chamber 70. A cylindrical wall 76 defines a passage for receiving housing 50 and surrounding water jacket structure 78 having outlets 80 and 82 permits circulation of water introduced around chamber 70 to flow to outlets 80, 82 and maintain the temperature of the cuvette chamber and electrode apparatus constant. At the base of cylinder 76 and over the entrance of chamber 70 is disposed a sealing disc 84 of butyl rubber, 0.031 inch thick and defining a circular port 0.198 inch in diameter. Ring 86 secures disc 84 in place.

Prior to assembling electrode assembly 8 into housing 50, a spacer sleeve 64 of woven nylon mesh is slid over the tip of the electrode assembly 8 as shown in FIG. 3 and secured with O-ring 66. An aqueous electrolyte is placed in the chamber 52 of housing 50, the bottom of which is sealed by membrane 60 and then the electrode assembly 8 is inserted into chamber 52 to the position shown in FIG. 4 so that its upper end wall 53 abuts seat surface 36 of the electrode assembly. In this position the membrane 60 which was taut across the end surface of housing 50 is stretched to conical configuration and closely conforms to the central portion of the pH sensitive membrane 30 as covered by the mesh spacer 64. Electrolyte displaced by the assembly operation flows out through port 54.

The electrode assembly 8 and housing 50 are then inserted into cuvette chamber 70 as shown in FIG. 5. The permeable membrane 60 is further stretched and clamped in close conformity to the entire surface of glass membrane 30 and cylindrical projection 13 by the resilient disc 84. Thus the measuring pH glass membrane 30 and the electrolyte layer in contact with it (the thickness of which is determined by mesh spacer 64) is disposed entirely within the cuvette chamber 70 so that its entire active surface is directly exposed to the fluid to be analyzed. The permeable 60 is firmly clamped and the configuration of the membrane is controlled by surfaces of the electrode assembly 8 and housings 50 and 76 so that its diamensions may be accurately established after disassembly. The electrochemical analysis assembly is easy to calibrate and easy to clean. Addition details of the blood analysis system in which this structure is incorporated are set out in copending patent application Ser. No. 27,200, entitled "Fluid Analyzing Apparatus," filed in the names of Spergel et al. and assigned to the same assignee as this application, now U.S. Pat. No. 3,658,478.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention.

What is claimed is:

1. Electrochemical analysis apparatus comprising
   an electrode assembly including structure defining a chamber for receiving electrolyte and an electrode in said chamber for contact with said electrolyte,
   an electrical conductor providing an electrical conduction path between said electrode and the exterior of said electrode assembly,
   a cylindrical stem protion of smaller dimensions than the main portion of said chamber defining structure, said cylindrical stem portion projecting beyond the end of said chamber defining structure,
   a sensing surface at the end of said projecting stem portion and defining an annular junction zone, the external diameter of said stem portion being at least as great as the external diameter of said sensing surface in the plane of said annular junction zone,
   spacer means over said sensing surface, a selectively permeable membrane secured over said spacer means and said stem portion,
   structure defining an analysis chamber having a port receiving said sensing surface and said stem portion so that said sensing surface is entirely within said analysis chamber, and
   an annular resilent constricting member having a circular aperture of smaller diameter than said port secured to said analysis chamber in alignment with and immediately adjacent said port engaging and clamping said selectively permeable membrane against the external surface of said stem portion to maintain said selectively permeable membrane in taut relation firmly against said spacer means so that a small but accurately defined electrolyte space of uniform thickness that is entirely within said analysis chamber is defined between said sensing surface and said permeable membrane, and said permeable membrane conforms to the surface configuration of the entire external surface of said sensing surface and the portion of said stem in said analysis chamber.

2. The apparatus as claimed in claim 1 wherein said analysis chamber is cylindrical configuration and the axis of said electrode assembly is coaxial with the axis of said chamber and the portion of said stem portion in said analysis chamber is closely spaced from the wall of said analysis chamber to define a thin annular space, and further including an inlet conduit disposed in tangential communication with said analysis chamber so that fluid introduced into said analysis chamber through said inlet conduit flows with swirling motion across said selectively permeable membrane.

3. The apparatus as claimed in claim 1 wherein said electrode assembly is a combination electrode having two cylindrical glass tubes in coaxial relation, the outer tube defining said electrolyte receiving chamber, the lower end of the inner tube projecting beyond the lower end of said outer tube and defining said projecting stem protion, said lower end of said outer tube defining a surface clamping said selectively permeable membrane against an upper surface of said constricting member that extends radially outward from said circular aperture and said sensing surface is the outer surface of a smoothly curved pH sensitive glass disc fused to said inner tube.

4. The apparatus as claimed in claim 1 wherein said chamber defining structure includes an end surface at its lower end that is disposed radially outward from said stem portion, and said constricting member has an upper surface that extends radially outward from said circular aperture, said end surface clamping said selectively permeable membrane against said upper surface of said constricting member.

5. Electrochemical analysis apparatus for use with an analysis chamber comprising
  an electrode assembly including structure defining a chamber for receiving electrolyte and a half cell in said chamber for contact with said electrolyte,
  an electrical conductor providing an electrical conduction path between said half cell and the exterior of said electrode assembly, said chamber defining structure having a tubular stem portion of uniform cross-sectional dimension along its axial length and of smaller dimensions than the main portion of said chamber defining structure projecting axially beyond the lower end of said main portion, said main portion having an end surface at its lower end that is disposed radially outwardly from said stem portion,
  a pH sensitive membrane secured across the end of said projecting stem portion and defining an annular junction zone, the external cross sectional dimensions of said stem portion being at least as great as the external dimensions of said pH sensitive membrane in the plane of said annular junction zone,
  a spacer sleeve secured over said sensing surface, said stem portion and the lower portion of said main portion, said spacer sleeve defining an electrolyte space of uniform thickness over said pH sensitive membrane,
  an electrode assembly housing having a passage open at both ends, and
  a selectively permeable membrane secured over one end of said housing passage to define a chamber for receiving electrolyte, said electrode assembly being seated in said electrolyte receiving chamber so that said pH sensitive membrane and said spacer means are adjacent to and stress said selectively permeable membrane.

6. Electrochemical analysis apparatus comprising
  an electrode assembly including structure defining a chamber for receiving electrolyte and a half cell in said chamber for contact with said electrolyte,
  an electrical conductor providing an electrical conduction path between said half cell and the exterior of said electrode assembly, said chamber defining structure having a tubular stem portion of uniform cross-sectional dimension along its axial length and of smaller dimensions than the main portion of said chamber defining structure projecting axially beyond the lower end of said portion, said main portion having an end surface at its lower end that is disposed radially outwardly from said stem portion,
  a pH sensitive membrane secured across the end of said projecting stem portion and defining an annular junction zone, the external cross sectional dimensions of said stem portion being at least as great as the external dimensions of said pH sensitive membrane in the plane of said annular junction zone,
  a spacer sleeve secured over said sensing surface, said stem portion and the lower portion of said main portion, said spacer sleeve defining an electrolyte space of uniform thickness over said pH sensitive membrane,
  an electrode assembly housing having a passage open at both ends,
  a selectively permeable membrane secured over one end of said housing passage to define a chamber for receiving electrolyte, said electrode assembly being seated in said electrolyte receiving chamber so that said pH sensitive membrane and said spacer means are adjacent to and stress said selectively permeable membrane,
  an analysis chamber having a port, and
  an annular resilient constricting member having a aperture of smaller cross-sectional dimensions than said port in said analysis chamber, said constricting member being secured to said analysis chamber in alignment with and immediately adjacent said port and said projecting stem portion extending through said port so that said constricting member engages and clamps said permeable membrane firmly against said spacer sleeve.

7. The apparatus as claimed in claim 6 wherein said electrode assembly is a combination electrode having two cylindrical glass tubes in coaxial relation, the outer tube defining said electrolyte receiving chamber, the lower end of the inner tube projecting beyond the lower end of said outer tube and defining said projecting stem portion, said lower end of said outer tube defining a surface clamping said selectively permeable membrane against an upper surface of said constricting member that extends radially outward from said circular aperture and said pH sensitive membrane is a smoothly curved glass disc fused to said inner tube.

References Cited

UNITED STATES PATENTS

| | | | |
|---|---|---|---|
| 3,049,118 | 8/1962 | Arthur | 204—195 |
| 3,188,285 | 6/1965 | Watanabe et al. | 204—195 |
| 3,334,623 | 8/1967 | Hillier et al. | 204—195 |
| 3,410,778 | 11/1968 | Krasberg | 204—195 |
| 3,418,231 | 12/1968 | Haddad | 204—195 |
| 3,434,953 | 3/1969 | Porter et al. | 204—195 |
| 3,464,908 | 9/1969 | Donaldson | 204—195 |
| 3,479,270 | 11/1969 | Petersen et al. | 204—195 |
| 3,496,084 | 2/1970 | Stack | 204—195 |
| 3,498,889 | 3/1970 | Imredy et al. | 204—1 T |
| 3,505,195 | 4/1970 | Nielsen et al. | 204—195 |

TA-HSUNG TUNG, Primary Examiner